(12) United States Patent
Celina et al.

(10) Patent No.: US 8,796,346 B1
(45) Date of Patent: Aug. 5, 2014

(54) METHOD OF MAKING A CYANATE ESTER FOAM

(75) Inventors: Mathias C. Celina, Albuquerque, NM (US); Nicholas Henry Giron, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 397 days.

(21) Appl. No.: 13/409,410

(22) Filed: Mar. 1, 2012

Related U.S. Application Data

(60) Provisional application No. 61/466,176, filed on Mar. 22, 2011.

(51) Int. Cl.
*C08G 18/00* (2006.01)

(52) U.S. Cl.
USPC ............................................. 521/137

(58) Field of Classification Search
CPC ........................................ C08G 18/00
USPC ............................................. 521/137
See application file for complete search history.

(56) References Cited

U.S. PATENT DOCUMENTS

| | | | |
|---|---|---|---|
| 3,522,218 A * | 7/1970 | Zenner et al. .................. 528/68 |
| 4,006,098 A * | 2/1977 | Argabright et al. ............. 516/68 |
| 4,033,937 A * | 7/1977 | Argabright et al. ............. 528/71 |
| 4,369,302 A * | 1/1983 | Ikeguchi et al. ................ 528/73 |
| 4,558,115 A * | 12/1985 | Hefner, Jr. ..................... 528/92 |
| 5,045,609 A * | 9/1991 | Lee et al. ....................... 525/438 |
| 5,077,319 A * | 12/1991 | Wang et al. .................... 521/89 |
| 5,134,421 A * | 7/1992 | Boyd et al. ..................... 343/872 |
| 5,358,992 A * | 10/1994 | Dershem et al. ............... 524/439 |
| 5,524,422 A * | 6/1996 | Nguyen ......................... 53/477 |
| 6,822,067 B2 * | 11/2004 | Bauer et al. .................... 528/407 |
| 2009/0143257 A1* | 6/2009 | Teng et al. ..................... 507/219 |

FOREIGN PATENT DOCUMENTS

GB      1247207 A    *  9/1971

OTHER PUBLICATIONS

B. John et al., Foam Sandwich Composites with Cyanate Ester Based Syntactic Foam as Core and Carbon-Cyanate Ester as Skin . . . , J. Applied Polymer Sci., 2008, V. 110, 1336-1374.

B. John et al., Effect of Low-Density Filler on Mechanical Properties of Syntactic Foams of Cyanate Ester, J. Mat. Sci., 2007, V. 42, 5398-5405.

\* cited by examiner

*Primary Examiner* — Mike M Dollinger
(74) *Attorney, Agent, or Firm* — Kevin W. Bieg

(57) ABSTRACT

A cyanate ester resin mixture with at least one cyanate ester resin, an isocyanate foaming resin, other co-curatives such as polyol or epoxy compounds, a surfactant, and a catalyst/water can react to form a foaming resin that can be cured at a temperature greater than 50° C. to form a cyanate ester foam. The cyanate ester foam can be heated to a temperature greater than 400° C. in a non-oxidative atmosphere to provide a carbonaceous char foam.

22 Claims, 3 Drawing Sheets

METHOD OF MAKING A CYANATE ESTER FOAM

CROSS-REFERENCE TO RELATED APPLICATIONS

This application claims the benefit of U.S. Provisional Application No. 61/466,176, filed Mar. 22, 2011, which is incorporated herein by reference.

STATEMENT OF GOVERNMENT INTEREST

This invention was made with Government support under Contract No. DE-AC04-94AL85000 awarded by the Department of Energy. The Government has certain rights in the invention.

FIELD OF THE INVENTION

The invention relates to preparation of foamed cyanate ester resin materials, and more particularly, to foamed cyanate esters prepared using an isocyanate assisted foaming process in the presence of tertiary amine catalysts or similar strong nucleophilic catalysis and other co-curatives to achieve suitable foam solidification reactions. The invention further relates to a foamed cyanate ester that can be charred and yet retain a foam structure.

BACKGROUND OF THE INVENTION

Polymeric foams exist in the form of polyurethane or epoxy foams in which resins are foamed and cured into solid materials. Polyurethane foams are established materials with many reports on their formulations and processing requirements. Polyurethanes are commonly foamed using an in-situ chemical side reaction that produces gaseous $CO_2$ during the cure reaction. This reaction is specific to the properties of isocyanates, a key molecular building block of polyurethanes, which form carbamic acids in the presence of water and cleave off $CO_2$.

Considerably less knowledge exists regarding how to produce epoxy-based foams, mainly because simple chemically compatible foaming reactions as available for polyurethane foams do not exist for epoxy-based foams. Therefore, foamed epoxies are normally produced via addition of physical blowing agents, such as inorganic compounds that thermally decompose at low temperatures and produce gases, or via addition of low volatile liquids, such as freons or similar fluorinert compounds, that also result in gas formation and expansion during the exothermic epoxy cure. See, e.g., U.S. Pat. No. 6,110,982 to Russick et al. However, a process for foaming curable epoxy resins via the generation of $CO_2$ from a suitable precursor (e.g., maleic anhydride) and curing into solid foams was recently described in U.S. Pat. No. 8,003,730 to Celina.

However, detailed methods on how to chemically foam and concurrently cure cyanate esters into solid foamed materials do not exist. Major challenges are found in the selection of a suitable base resin, availability of suitable cure reaction, compatibility with a chemical foaming reaction, and sufficient early foam stability (rapid viscosity increase) during the transition from a liquid resin to a curing foamed material. The final cure reactions must retain the solid foam structure and yield good conversion of the reactive pre-cursors.

Whether polyurethane or epoxy foams, such materials will decompose when exposed to temperatures above 300-400° C. because of their intrinsic molecular building blocks. The key constituents, such as many epoxy resins, amine curatives, and polyols, are thermally weak and degrade via chain scission into low molecular weight fragments. Under oxidative conditions the materials will start to burn, and under inert (nitrogen atmosphere) conditions, the materials will pyrolize and decompose into gaseous, liquid and some carbonaceous residues. Char residues of urethane and epoxy foams at temperature above 400° C. are often in the range of only 10-20%. There are currently no commercial polymeric foams available that offer intrinsic high levels of solid char residues coupled with good retention of dimensional features at pyrolysis decomposition temperatures.

Therefore, a need remains for a cyanate ester foam that can be charred and yet retain a foam structure.

SUMMARY OF THE INVENTION

The present invention is directed to cyanate ester resins, blown with isocyanate reagents delivering $CO_2$, and then cured into closed cell organic foam materials. Upon thermal exposure to temperatures above about 400° C., due to their cyanate ester content, such foams will retain shape and form solid carbon residues in attractive yields. At temperatures above 550-600° C. such char residues will transition into conductive carbon species, hence the high temperature thermal decomposition of cyanate ester foams delivers high char yield carbon foams with graphitic properties.

A method of making a solid cyanate ester foam comprises forming a resin mixture of at least one cyanate ester resin combined with an isocyanate foaming resin and adding a catalyst/water mixture at a temperature sufficient to keep the resin mixture reacting to form a foaming resin that cures to form a cyanate ester foam. The at least one cyanate ester resin can comprise a phenolic novolac-based cyanate ester resin. The isocyanate foaming resin can be derived from a polymeric methylene diisocyanate. A co-curative can be added to the resin mixture prior to adding the catalyst/water mixture. For example, the co-curative can comprise an epoxy- or polyol-based curing agent or a combination thereof. The resin mixture comprise between 50 and 90 parts of the at least one cyanate ester resin, between 1 to 30 parts of the isocyanate foaming resin, and less than 35 parts of the co-curative (by weight), to provide a total resin mixture of one hundred parts. The catalyst can comprise a nucleophilic compound, such as an imidazole compound with a substitution group on the tertiary nitrogen. The imidazole compound can comprise 1-methyl imidazole. The catalyst can be added at a concentration of less than approximately 2 pph (parts per hundred of the total resin mixture). The water can be added at a concentration of less than approximately 3 pph. A surfactant can be added to the resin mixture prior to adding the catalyst/water mixture. For example, the surfactant can be an anionic surfactant, a cationic surfactant, or a non-ionic surfactant. For example, the surfactant can be an organo polysiloxane compound, an amine alkylbenzene sulfonate compound, an alkyl phenol ethoxylate compound, a silicone-based non-ionic compound, a poly ethyleneoxide block non-ionic compound, or a nonionic alkoxylate-polyethylene glycol mono(nonyl phenyl)ether compound. The surfactant can be added at a concentration of between approximately 0.1 pph and approximately 1 pph. An inorganic additive, such as clay, wollastonite, or mica, can be further added to the resin mixture. Finally, the cyanate ester foam can be heated to a temperature greater than 400° C. in a non-oxidative atmosphere to provide a carbonaceous char foam.

The present invention is also directed to a cyanate ester resin mixture comprising at least one cyanate ester resin of between approximately 50 wt % and 90 wt %, an isocyanate foaming resin of between approximately 1 wt % and approximately 30 wt %, a co-curative of less than approximately 35 wt %, resulting in a resin mixture of hundred parts, and a surfactant of less than approximately 1 pph (parts per hundred of the total resin mixture), and a catalyst/water mixture of less than approximately 3 pph.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

The present invention is directed to a method for the production of foamed cyanate ester materials. Some cyanate ester resins, reactive resins similar to epoxies or urethanes but with different functional groups, have exceptional intrinsic high char yields. Similarly as in polyurethane or epoxy foams, a base resin is required that can be foamed and cured. Cyanate ester resins are functional resins commonly used in composites and available in suitable viscosity and reactivity range to serve as a base resin for foams. Cyanate ester resins can self polymerize (cure) via trimerization upon addition of a suitable catalyst, and do not necessarily require additional curatives. They have been used in special composite materials but not fabricated into in-situ curable formulations which yield cyanate ester foam materials.

As the most basic system, a cyanate ester foam can be prepared by combining a cyanate ester resin with isocyanate reagents and initiating a foaming reaction with the addition of water/catalyst mixtures. Over a large range of temperatures, foams can be made this way that resemble fine-celled shaving foam, but cure reactions can be too slow to solidify the foam into a rigid material prior to the beginning of foam coalescence. If they cure at all, such basic systems are also very brittle and mechanically not attractive.

According to the present invention, such mixtures can be further optimized in terms of their foam processing and cure reactivity, as well as their mechanical properties. Suitable foam systems use additional co-curatives acting as more rapid initial viscosity stabilizers, as well as good timing of overall cure catalysis. Further, because discreetly different and competing cure reactions are involved, interpenetrating networks are formed that offer enhanced mechanical toughness and smaller cell sizes.

Figure 1:
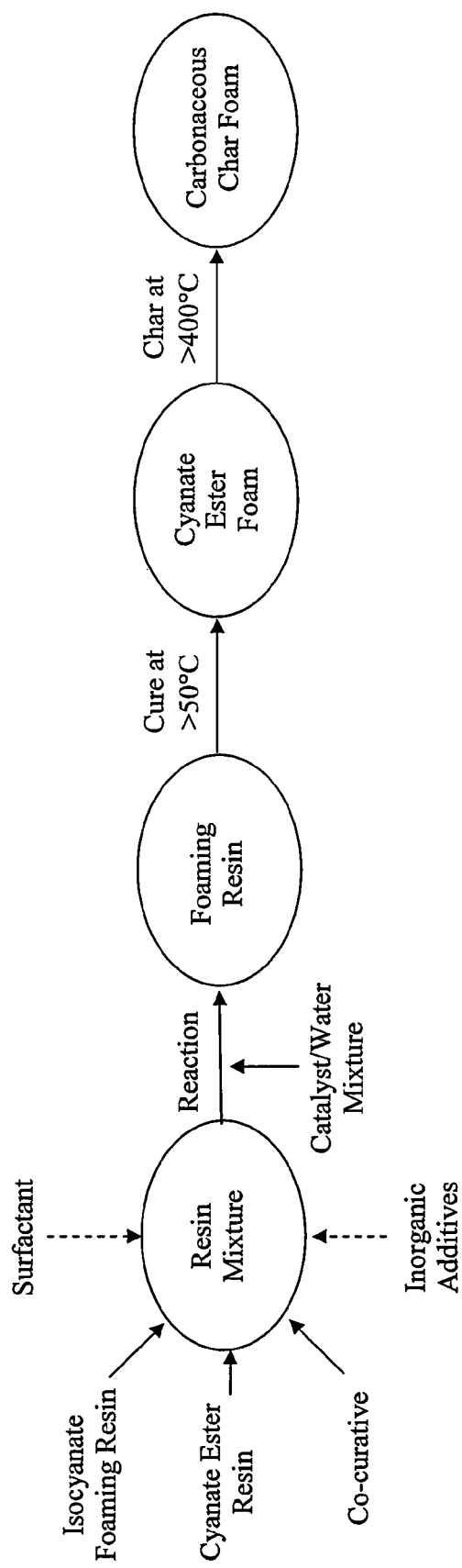
FIG. 1 shows a method for preparing and charring a cyanate ester foam.

As shown in FIG. 1, a method of the present invention comprises forming a resin mixture by blending the main cyanate ester resin with an isocyanate foaming resin at a suitable temperature that provides a viscosity range attractive to resin mixing and then adding a simple catalyst and water mixture to induce foaming. The mixture constituents react to form a foaming resin which in the presence of additional suitable co-curatives can subsequently be cured to form a cyanate ester foam material. For example, the cyanate ester resin can be a novolac-based cyanate ester resin and the isocyanate resin can be derived from a polymeric methylene diisocyanate (pMDI). Curing agents and other additives can be added to the resin mixture to control the reaction process as well as physical and chemical properties of the resulting foam and its cure dynamics. Traditional surfactants can be used as additives to enable controlled and homogenous foam formation and cell size, as well as initial foam stability. After mixing of resin precursors, as a final step the water and catalyst are added to initiate the foaming process. For example, an imidazole catalyst can be an imidazole compound with a substitution group on the tertiary nitrogen (that is, the hydrogen must be substituted with a methyl or other similar group). The catalyst is preferably 1-methyl imidazole. The resulting foams contain more than 50% cyanate ester resin constituents and are therefore called cyanate ester foams. Mechanical properties and foam densities can be easily varied and adjusted as a function of the basic resin viscosity and functionality, nature and amount of extra curatives, as well as catalytic and water levels and pre-warm/cure temperature affecting foaming and cure kinetics.

In one embodiment, the cyanate ester resin blended with the isocyanate resin was polymerized with low amounts of nucleophilic initiators (anionic cure), water and surfactants in the presence of epoxy co-curatives at temperatures from 40° C. temperature to 100° C. The isocyanate produced sufficient $CO_2$ quickly enough to yield a rapidly expanding fine-celled cyanate ester foam of sufficient stability to cure into a solid foamed material. The resulting cured glassy materials are chemically foamed cyanate esters with a large range of physical densities available, depending on variable concentrations of cyanate ester, isocyanate, extra curative, water, catalyst initiators, surfactants and reaction temperatures. Excellent foams can be obtained at very reasonable curing temperatures of 50-80° C.

In one embodiment, a cyanate ester base resin of suitable viscosity to allow for mixing and initial foam stability is mixed with the isocyanate resin at a temperature sufficient to allow mixing (that is, a temperature sufficient to make the cyanate ester processable enough, i.e., greater than 35° C.) to make a pre-warmed resin mixture. Co-curatives (either as is, if the viscosity is sufficiently low, or also pre-warmed) comprising epoxy resins or combinations therefore, as well as suitable reactive polyols, can be added. A surfactant can be added to control cell size during subsequent foaming. A catalyst comprising an imidazole compound, other tert amine or derivative thereof, plus water for isocyanate-based foaming purposes is added as the last step while the mixture is pre-warmed and of mixable viscosity. A curable mixture is obtained that will yield a solid, cured cyanate ester foam when cured at an elevated temperature.

In all embodiments, the cyanate ester resin is mixed with isocyanate resins allowing for chemical foaming. Usable cyanate ester resins include all of the commercially available resins, for example but not exclusively produced by Huntsman Advanced Materials or Lonza Company. These cyanate esters vary in viscosity and reactivity; examples are: Arocy B10, B30, B40, L10, M10, M20, M30, XU366, XU 371, XU378, XU379 or Primaset PT15, PT30, PT60.

Isocyanate resins are widely used polyurethane precursor resins and available in a large range from various manufacturers, i.e., Dow, Bayer, Huntsman and many others. Of particular interest are the polymeric MDI products that offer less vapor pressure than the traditional TDI based precursors. Examples of isocyanate resins are: Dow PAPI 20, 27, 580N, 901, 94, 2940, Isonate 143L, 181, the Bayer Mondur 445, 448, 489, 501, 541, 582, 841, 1437, 1453 and Bayer's various Desmodur isocyanates, the Huntsman Rubinate and Suprasec materials, i.e. Rubinate M, 44, 1680, 9225, 9433, 9447, 9009, 9490, 9495, 9520, 9040, 9272, 9511, 9234, 1245, 1820, 9016, 1670 and others, or Suprasec 5025, 9568, 9572, 9582, 9584, 9520, 9561. Any isocyanate resin that is comparable to the above listed materials can be used regardless of the manufacturer.

In some embodiments, the cyanate ester foam can be modified with the addition of co-curatives, such as epoxy or polyol resins. Such additives vary processing viscosity and control foam stability during the early cure stages, as well as achieve improved toughness and variations in other mechanical properties. These co-curatives assist with further crosslinking and hybrid cure network formation. Such reactive compounds will affect viscosity and cure features. Similarly, inorganic additives using clays, wollastonite, mica and the whole range of commonly-used fillers can be incorporated, again with the aim of tuning mechanical properties, hardness, char behavior, thermal properties or related features. The limits to this system are found in amine-based cure reagents, as amines will instantly react with the isocyanate ingredient used for blowing purposes to form urea derivatives, and are therefore not suitable to be used in the method of the present invention.

Epoxy materials are formed by cross-linking reactions between epoxy resins and curing agents that create a three-dimensional covalent bond polymer network. For that matter, there are numerous commercially available epoxy resins and their curing agents that are used to prepare epoxy materials with varying thermal, mechanical, and electrical properties. Such epoxy resins can serve as co-curatives for the cyanate ester foam systems described here. A type of epoxy resin that is commonly used is diglycidyl ether of bisphenol A (DGEBA); another common type of epoxy resin is a phenolic novolac based epoxy material. Examples of these are: the solid Epon 1001, Epon 1002, Epon 1004, Epon 1007, Epon 1009, Epon 1031 and Epon SU-8; and the liquid, Epon 160, Epon 161, Epon 154, Epon 826, Epon 828, Epon 830, Epon SU-2.5, Epon SU-3 manufactured by Hexion (previously Shell Chemical Corporation); and EN439, DER331, and similar materials manufactured by Dow Chemical. Other materials may be Epalloy® and Erisys® epoxies from the CVC Specialty Chemicals, Inc. resin company and pure Araldite® epoxy resins (Huntsman Corporation advanced materials). Also, the following epoxy resins can be used: the solid ERL-2002, 2003 and 3001 and the liquid ERL 2772, 2774 and 3794 manufactured by Bakelite Co. of the Union Carbide Plastics Division. Any epoxy resin that is comparable to the above listed epoxy resins can be used regardless of the manufacturer. Resins can be easily mixed to result in a suitable viscosity and reactivity range (epoxy equivalent reactivity by resin weight value).

In one embodiment, an epoxy base resin of suitable viscosity to allow for mixing and initial foam stability is mixed with the cyanate ester resin to an approximate content of 25%. In another embodiment, two different epoxy resins are blended together with the cyanate ester resin. In another embodiment, two different epoxy resins plus an extra polyol reagent are blended together and are collectively added for a total of about 30% in the resulting cyanate ester resin mix.

Suitable polyols can act as additional crosslinkers, particularly in the early foam formation, as polyols will quickly react with the isocyanate reagent in the resin mixture. Polyols are major industrial precursors and are available in many types as traditional aliphatic polyols, such as glycerol, butane diol, hexamethylene diol, various polyethers with different chain length, (both ethylene glycol and propylene glycol based) and polyester polyols, also with aromatic derivatives, such as phthalic acid glycol esters. Such precursors are too numerous to list them all and examples are given as: The Jeffol Series from Huntsman, Jeffol PPG-1000, PPG2000, PPG2801, PPG3606, FX31-167, G30-240, 030-650, 031-28, 031-35, 031-43, R350X, R425X, R470X, A630, A800, AD310, AD500, S490, SA499, SD361, SD441, SD360, SG522. Similar product series are available from Bayer as Mutranol, Acclaim, Arcol, Hyperlite, Softcell and Ultracell polyethers, from Dow as Voranol, Voracor and Tone polyols, from Stepan company as Stepanpol materials (aromatic polyester polyols), i.e. Stepanpol PS4002, PS3152, PS2502, PS2402, PS 2352, PS1752 and others. Any polyol resin that is comparable to the above listed materials can be used regardless of the manufacturer.

Surfactants are used in traditional polyurethane and epoxy foams to promote foaming and stabilization of the subsequent cellular structure. A surfactant generally serves to decrease the surface tension of the pre-cure composition and thereby promote increased expansion, smaller cells, and more uniform cell size and texture of the expanded formed product. The surfactants used in polyurethane foam systems, such as silicone-based surfactants, are the same ones generally used in epoxy foams. The cell structure can be greatly affected by the surfactant, which in turn influences the properties of the resultant foam. Since cyanate esters are no different in a sense of being organic curable resins of varying viscosity, such surfactants can be used in a similar manner within the invention described here.

In various embodiments, anionic, cationic, and non-ionic types of surfactants can be used, with the latter being the more commonly applied compounds in organic resin foams. Of hundreds of available commercial surfactants, many surfactants will foam well during early rise of the foam, but for extended cure times can lead to foam contraction or even foam collapse as they can commence partially acting as defoamers. In another embodiment, even without a surfactant, suitable foams can be obtained. Their structure will in general be coarser than foams produced with a surfactant. Finer cells can be achieved with the help of surfactants. Many non-ionic based surfactants and some types normally used in polyurethane foams were evaluated and work in the foam system of the present invention. Suitable surfactants include, but are not limited to, Air Products DC 5906, Air Products DC193, Air Products DC 5598, Air Products DC 5577, Air Products LK 221 (all are organo polysiloxane); less attractive are Shin-Etsu KF-105 (modified organo polysiloxane), Stepan G3300 (amine alkylbenzene sulfonate), Cedepal CO-210 (alkyl phenol ethoxylate), or Polystep F-5 (>95% nonionic alkoxylate—polyethylene glycol mono(nonyl phenyl)ether. Some are silicone based or poly ethyleneoxide block non-ionic surfactants. A variety of surfactants can be used to provide sufficient performance, generally added at a concentration of less than approximately 2 wt %. For the cyanate ester foams described here the addition of 0.5% surfactant works well.

In principle, most tertiary amines, either aliphatic- or aromatic-based, can accelerate many types of cyanate ester, urethane or epoxy cure reactions. Most condensation crosslinking cure processes involving epoxies can be accelerated and efficiently cured with, for example, a low concentration of dimethyloctylamine, piperazine, imidazole derivatives or with many other amines possessing polymerization initiating nucleophilic character. Air Products as a company specializes in the marketing of various foaming catalysts, predominantly amine based and supplied to foam manufacturing as a full range of mostly polyurethane foaming and crosslinking catalysts. Many commercial catalysts, such as DABCO T-12, DABCO TMR, DABCO TMR-3, POLYCAT SA-102, DABCO T12, POLYCAT 26, DABCO MB20, POLYCAT 41, DABCO Crystalline, DABCO BL-17, DABCO BL-19, DABCO 33 LV, or CUREZOL 2E4MZ, are available and are commonly used in quantities of approximately 1%. Most of these catalysts will accelerate epoxy cure reactions but are also active in accelerating cyanate ester curing. The cure of cyanate ester resins involves a trimerization reaction to form a triazine derivative via nucleophilic addition reactions.

Testing showed that 1-methyl imidazole, which is a tertiary amine catalyst, DABCO 33 LV or PolyCat 41, for example, are uniquely suited in their effectiveness to catalyze the cyanate ester resin cure. This is apparently related to the small size of these molecules, not just their basicity, but the strong nucleophilic character of the nitrogen free electron pair. Other catalysts exist that display strong nucleophilic character in a highly mobile small molecule with an exposed unbonded nitrogen electron pair, including N-substituted pyrimidines. Similarly, crown ethers with dissolved alkali hydroxides possess free OH⁻ that can be an attractive nucleophile. Interestingly, even related imidazole derivatives, like 2-ethyl 4-methyl imidazole, did not act as a particularly attractive catalyst, likely because of the non-substituted 1-nitrogen. It appears that at minimum the 1-nitrogen in the imidazole or in the LV33 must be hydrogen free; that is methyl substituted or similar.

In all of the examples and embodiments described below, the temperatures and concentrations are approximate, rounded to the nearest significant figure.

Example 1

Slow Curable Foamed Cyanate Ester Resin

In one embodiment, 80 parts of XU371 cyanate ester resin was combined with 20 parts (by weight) pMDI (Dow PAPI 27 isocyanate resin). In this embodiment, temperature was maintained at approximately 65° C. at which the viscosity was low enough for resin mixing purposes. 0.5 pph (parts per hundred parts of total resin mixture) silicone-based surfactant such as DC 193 (manufactured by Air Products) and 0.4 pph of 1-methyl imidazole catalyst and 1 pph of water was added. A foaming resin of slowly curable nature and good flow was produced. In another embodiment, 80 parts of Lonza PT30 cyanate ester resin instead of XU371 cyanate ester was used. Such slowly curing foams do not have optimized cell structure and are relatively brittle.

Example 2

Foamed Cyanate Ester Resin with Basic Cure

In one embodiment, 55 parts of XU371 cyanate ester resin was combined with 20 parts pMDI (Dow PAPI 27 isocyanate resin). An additional epoxy curative, Epon 161, was added as 25 parts (by weight). In this embodiment, temperature was maintained at approximately 65° C. at which the viscosity was low enough for resin mixing purposes. 0.5 pph (parts per hundred parts of total resin mixture) silicone-based surfactant such as DC 193 (manufactured by Air Products) and 0.4 pph of 1-methyl imidazole catalyst and 1 pph of water was added. A foaming resin of curable nature and good flow was produced. In another embodiment, 55 parts of Lonza PT30 cyanate ester resin instead of XU371 cyanate ester was used.

Example 3

Foamed Cyanate Ester Resin with Different Isocyanate

In one embodiment, 55 parts of XU371 cyanate ester resin was combined with 20 parts pMDI (Suprasec 9561 isocyanate resin). An additional epoxy curative, Epon 161, was added as 25 parts (by weight). In this embodiment, temperature was maintained at approximately 65° C. at which the viscosity was low enough for resin mixing purposes. 0.5 pph (parts per hundred of total resin) silicone-based surfactant such as DC 193 (manufactured by Air Products) and 0.4 pph of 1-methyl imidazole catalyst and 1 pph of water was added. A foaming resin of curable nature and good flow was produced. In another embodiment, 55 parts of Lonza PT30 cyanate ester resin instead of XU371 cyanate ester was used.

Example 4

Foamed Cyanate Ester Resin with Two Epoxy Co-Curatives

In one embodiment, 55 parts of XU371 cyanate ester resin was combined with 20 parts pMDI (Suprasec 9561 isocyanate resin). Additional epoxy curatives, Epon 161 with 12.5 parts, and Epon 154 with 12.5 parts were added. In this embodiment, temperature was maintained at approximately 65° C. at which the viscosity was low enough for resin mixing purposes. 0.5 pph (parts per hundred parts of total resin mixture) silicone-based surfactant such as DC 193 (manufactured by Air Products) and 0.4 pph of 1-methyl imidazole catalyst and 1 pph of water was added. A foaming resin of excellent curable nature and good flow was produced. In another embodiment, 55 parts of Lonza PT30 cyanate ester resin instead of XU371 cyanate ester was used.

Example 5

Foamed Cyanate Ester Resin with Epoxy and Polyol Co-Curatives

In one embodiment, 55 parts of XU371 cyanate ester resin was combined with 20 parts pMDI (Suprasec 9561 isocyanate resin). Additional epoxy curatives, Epon 161 with 11 parts, and Epon 154 with 11 parts, and one polyol reagent, Jeffol R-350× with 3 parts, were added. In this embodiment, temperature was maintained at approximately 65° C. at which the viscosity was low enough for resin mixing purposes. 0.5 pph (parts per hundred of total resin mixture) silicone-based surfactant such as DC 193 (manufactured by Air Products) and 0.4 pph of 1-methyl imidazole catalyst and 1 pph of water was added. A foaming resin of excellent curable nature and good flow was produced. In another embodiment, 55 parts of Lonza PT30 cyanate ester resin instead of XU371 cyanate ester was used.

Example 6

Cyanate Ester Foam, Epoxy and Polyurethane Foam Thermal Decomposition Behavior

As described above, one reason for the selection of curable cyanate ester resins and the production of cyanate ester based foam materials is the unusual thermal stability of this precursor. Some cyanate ester materials when cured have a strong tendency to form carbonaceous residues at high temperatures.

Figure 2:
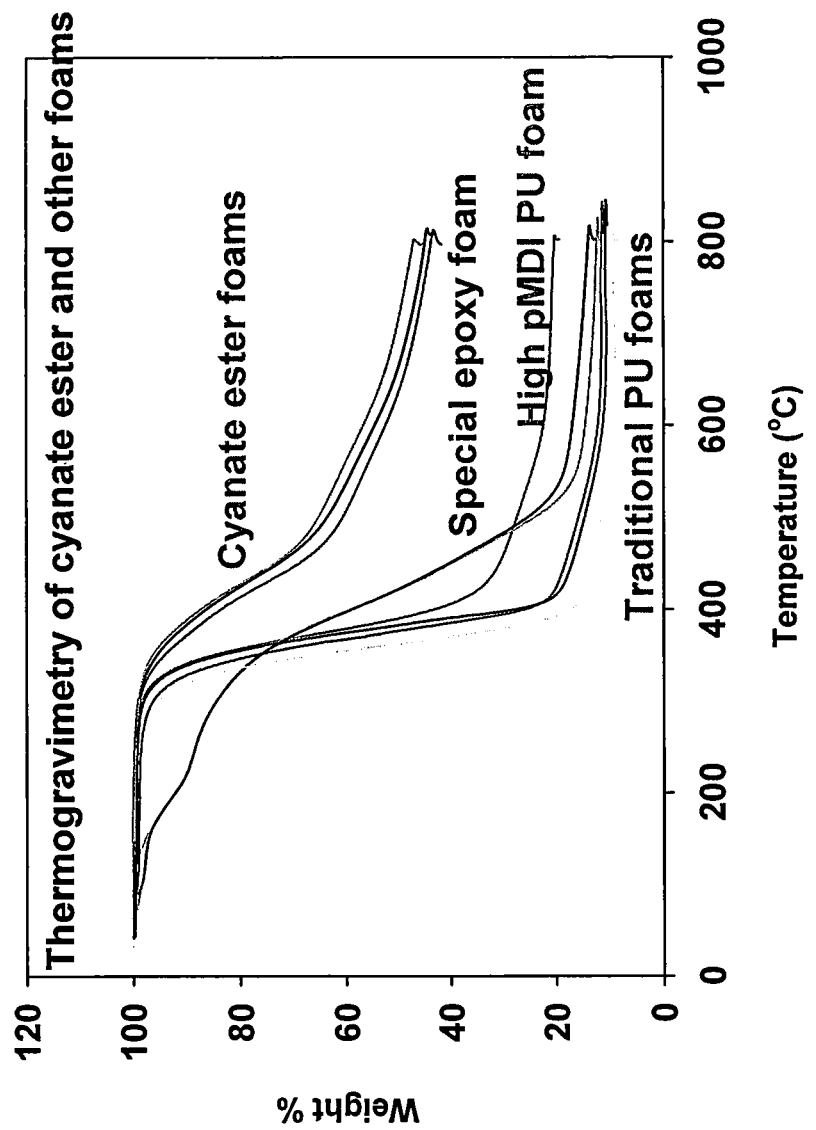
FIG. 2 is a graph of the thermal decomposition behavior of different polymeric foams under a $N_2$ atmosphere.
Figure 3A:
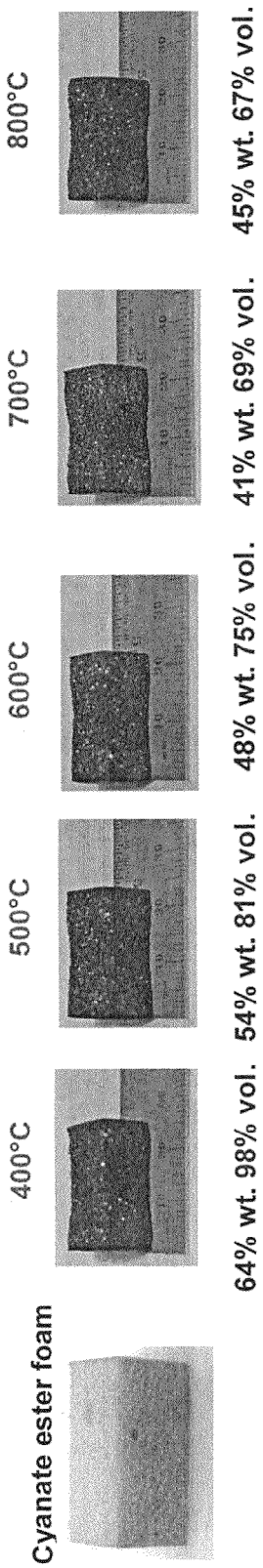
FIG. 3A is photographs illustrating the mass and volume/shape retention of cyanate ester foam material (30 minutes at maximum temperature furnace baking).
Figure 3B:
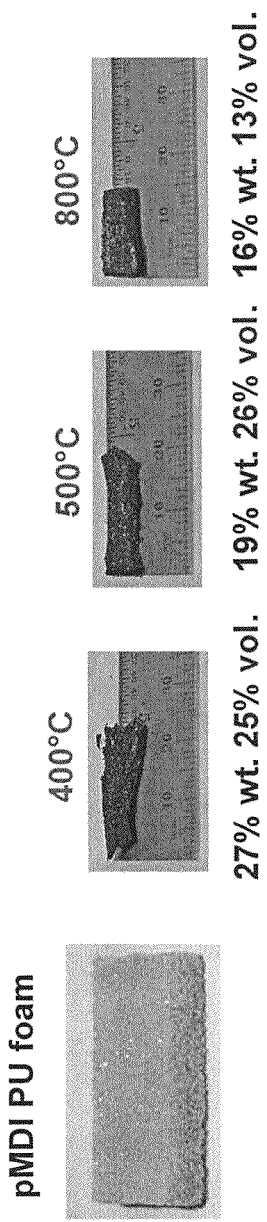
FIG. 3B is photographs illustrating significant mass and volume loss for high pMDI polyurethane foam (30 minutes at maximum temperature furnace baking).

Thermogravimetric analysis (TGA, weight loss monitored as a function of temperature) is a simple method to demonstrate the differences in the behavior of resins or foams. The TGA in FIG. 2 shows that the cyanate ester foam materials of the present invention have considerably more weight retention than traditional polyurethane foams, polyurethane foams with high levels of pMDI precursors, and specialized epoxy foams. These are substantial differences. The much better mass and associated volume retention of cyanate ester foams is also apparent in furnace decomposition experiments when these foams are exposed to high temperatures. FIG. 3A shows photographs for cyanate ester based foams at various temperatures, in comparison with a traditional pMDI-based polyurethane, as shown in FIG. 3B.

Although the invention has been described with reference to one or more particular embodiments, this description is not meant to be construed in a limiting sense. Various modifications of the disclosed embodiments as well as alternative embodiments of the invention will become apparent to persons skilled in the art. It is therefore contemplated that the appended claims will cover any such modification or embodiments that fall within the scope of the invention. The entire disclosures of all references, applications, patents and publications cited above are hereby incorporated by reference.

We claim:

1. A method of making a cyanate ester foam, comprising:
   forming a resin mixture comprising at least one cyanate ester resin and a isocyanate foaming resin, thereby providing a total resin mixture of hundred parts by weight;
   adding a catalyst/water mixture to the resin mixture at a temperature sufficient to keep the resin mixture reacting to form a foaming resin; and
   curing the foaming resin to make a solid cyanate ester foam.

2. The method of claim 1, wherein the at least one cyanate ester resin comprises a phenolic novolac-based cyanate ester resin.

3. The method of claim 1, wherein the isocyanate foaming resin is derived from a polymeric methylene diisocyanate.

4. The method of claim 1, wherein the resin mixture comprises between 70 and 99 parts of the at least one cyanate ester resin and between 1 to 30 parts of the isocyanate foaming resin.

5. The method of claim 1, wherein the resin mixture further comprises a co-curative.

6. The method of claim 5, wherein the co-curative comprises an epoxy- or polyol-based curing agent or a combination thereof.

7. The method of claim 5, wherein the resin mixture comprises between 50 and 90 parts of the at least one cyanate ester resin, between 1 to 30 parts of the isocyanate foaming resin, and less than 35 parts of the co-curative.

8. The method of claim 1, wherein the catalyst comprises a nucleophilic compound.

9. The method of claim 8, wherein the nucleophilic compound comprises an imidazole compound with a substitution group on the tertiary nitrogen.

10. The method of claim 9, wherein the imidazole compound comprises 1-methyl imidazole.

11. The method of claim 1, wherein the catalyst is added at a concentration of less than approximately 2 parts per hundred parts of the total resin mixture.

12. The method of claim 1, wherein the water is added at a concentration of less than approximately 3 parts per hundred parts of the total resin mixture.

13. The method of claim 1, further comprising adding a surfactant to the resin mixture prior to adding the catalyst/water mixture.

14. The method of claim 13, wherein the surfactant is selected from the group consisting of an anionic surfactant, a cationic surfactant, and a non-ionic surfactant.

15. The method of claim 13, wherein the surfactant is selected from the group consisting of an organo polysiloxane compound, an amine alkylbenzene sulfonate compound, an alkyl phenol ethoxylate compound, a silicone-based non-ionic compound, a poly ethyleneoxide block non-ionic compound, and a nonionic alkoxylate-polyethylene glycol mono (nonyl phenyl)ether compound.

16. The method of claim 13, wherein the surfactant is added at a concentration of between approximately 0.1 pph and approximately 1 parts per hundred parts of the total resin mixture.

17. The method of claim 1, further comprising adding an inorganic additive to the resin mixture.

18. The method of claim 17, wherein the inorganic additive is selected from a group consisting of clay, wollastonite, and mica.

19. The method of claim 1, wherein the curing step comprises heating the foaming resin to a temperature greater than 50° C. for sufficient time to achieve solidification of the cyanate ester foam.

20. The method of claim 1, further comprising heating the cyanate ester foam to a temperature greater than 400° C. in a non-oxidative atmosphere to provide a carbonaceous char foam.

21. A cyanate ester resin mixture, comprising at least one cyanate ester resin of between approximately 50 wt % and 90 wt %, an isocyanate foaming resin of between approximately 1 wt % and 30 wt %, a co-curative of less than approximately 35 wt % the mixture further comprising a catalyst/water mixture of less than approximately 3 parts per hundred of the resin mixture.

22. The cyanate ester resin mixture of claim 21, further comprising a surfactant of less than approximately 1 parts per hundred of the total resin mixture.

* * * * *